(12) United States Patent
Khan

(10) Patent No.: US 9,498,999 B2
(45) Date of Patent: Nov. 22, 2016

(54) LASER MARKING

(75) Inventor: Nazir Khan, Lenton (GB)

(73) Assignee: Siltech Limited, Lenton, Nottingham (GB)

(*) Notice: Subject to any disclaimer, the term of this patent is extended or adjusted under 35 U.S.C. 154(b) by 934 days.

(21) Appl. No.: 12/520,401

(22) PCT Filed: Dec. 18, 2007

(86) PCT No.: PCT/GB2007/050765
§ 371 (c)(1),
(2), (4) Date: Jun. 19, 2009

(87) PCT Pub. No.: WO2008/075101
PCT Pub. Date: Jun. 26, 2008

(65) Prior Publication Data
US 2010/0018957 A1 Jan. 28, 2010

(30) Foreign Application Priority Data

Dec. 19, 2006 (GB) .................................. 0625186.2
Dec. 19, 2006 (GB) .................................. 0625187.0
Dec. 19, 2006 (GB) .................................. 0625188.8

(51) Int. Cl.
| | |
|---|---|
| *C08K 5/17* | (2006.01) |
| *C08K 3/22* | (2006.01) |
| *B41M 5/124* | (2006.01) |
| *B41M 5/26* | (2006.01) |
| *C09D 131/00* | (2006.01) |
| *C09D 131/04* | (2006.01) |
| *C08K 3/24* | (2006.01) |

(52) U.S. Cl.
CPC ............ *B41M 5/267* (2013.01); *C09D 131/00* (2013.01); *C09D 131/04* (2013.01); *C08K 3/22* (2013.01); *C08K 3/24* (2013.01); *C08K 5/17* (2013.01); *C08K 2003/2255* (2013.01)

(58) Field of Classification Search
USPC .......................... 219/121.6, 121.85, 121.86
See application file for complete search history.

(56) References Cited

U.S. PATENT DOCUMENTS

| | | | | |
|---|---|---|---|---|
| 3,102,868 | A | * | 9/1963 | Bolton et al. .................. 525/443 |
| 3,142,562 | A | * | 7/1964 | Blake .............................. 430/52 |
| 3,265,531 | A | * | 8/1966 | Pribble ....................... 346/135.1 |
| 3,322,552 | A | * | 5/1967 | Chopoorian et al. ......... 423/598 |
| 3,536,510 | A | * | 10/1970 | Wollenberg et al. ......... 106/448 |
| 3,661,574 | A | * | 5/1972 | Bredoux et al. .............. 430/203 |
| 3,760,319 | A | * | 9/1973 | Kawazoe ........................ 338/26 |
| 3,848,049 | A | * | 11/1974 | Ronzio et al. .................. 423/54 |
| 3,931,044 | A | * | 1/1976 | Maurin ........................... 502/24 |
| 4,098,748 | A | * | 7/1978 | Moore et al. ................. 523/200 |
| 4,098,753 | A | * | 7/1978 | Tsigdinos et al. ............ 523/200 |
| 4,900,617 | A | * | 2/1990 | Smith .......................... 428/325 |
| 5,053,440 | A | | 10/1991 | Schueler et al. |
| 5,346,802 | A | | 9/1994 | Ohbachi et al. |
| 5,496,881 | A | | 3/1996 | Annemaier et al. |
| 5,587,132 | A | * | 12/1996 | Nakajima et al. .............. 423/62 |
| 6,238,847 | B1 | | 5/2001 | Axtell et al. |
| 6,270,694 | B1 | | 8/2001 | Blount |
| 6,306,493 | B1 | | 10/2001 | Brownfield |
| 6,335,390 | B1 | * | 1/2002 | Seeger et al. .................. 524/186 |
| 6,562,087 | B1 | * | 5/2003 | Kodama et al. ................ 44/628 |
| 7,270,919 | B2 | * | 9/2007 | Stubbs ............................ 430/17 |
| 8,048,605 | B2 | * | 11/2011 | Khan et al. ................ 430/270.1 |
| 8,278,243 | B2 | * | 10/2012 | Khan et al. .................... 503/201 |
| 2003/0180660 | A1 | * | 9/2003 | Khan ......................... 430/270.1 |
| 2003/0191223 | A1 | | 10/2003 | Waterkamp et al. |
| 2004/0076752 | A1 | * | 4/2004 | Magdina et al. .............. 427/256 |
| 2004/0157975 | A1 | | 8/2004 | Kniess et al. |
| 2005/0032957 | A1 | | 2/2005 | Khan et al. |
| 2005/0269304 | A1 | | 12/2005 | Khan et al. |
| 2006/0040217 | A1 | | 2/2006 | Stubbs |
| 2006/0147842 | A1 | * | 7/2006 | Khan ............................ 430/311 |
| 2008/0305328 | A1 | * | 12/2008 | Green et al. .................. 428/354 |
| 2009/0048373 | A1 | * | 2/2009 | Clauss et al. ................... 524/86 |
| 2011/0151380 | A1 | * | 6/2011 | Jarvis et al. ............. 430/270.11 |

FOREIGN PATENT DOCUMENTS

| | | |
|---|---|---|
| CA | 225717 A | 11/1922 |
| EP | 0796743 A1 | 9/1997 |
| EP | 0835900 A2 | 10/1997 |
| EP | 0894896 A2 | 7/1998 |
| EP | 1705226 A1 | 9/2006 |
| JP | 48-081936 * | 11/1973 |
| JP | 03-250077 * | 11/1991 |
| JP | 09-316386 * | 12/1997 |
| JP | 11-029711 * | 2/1999 |
| KR | 2003077777 * | 10/2003 |
| RU | 2022706 * | 11/1994 |
| WO | 99/16625 A1 | 4/1999 |
| WO | 00/61377 A1 | 10/2000 |

(Continued)

OTHER PUBLICATIONS

Ostrouchko et al., "Therrmal destruction of polymer-sal;t compositions containing d-metals in the form of oxygen bearing anoins", Inorg. Mat. vol. 36(6) pp. 730-739 (2000).*
Machine translation of JP 2929642 (patent of JP 03-250077) Aug. 1999 4 pages.*
Liu et al. "Low temperature MoO3 film form a facile synthetic route for an efficient anode interfacial layer in organic optoelectronic devices", J. Matrial Chem.C., vol. 2 pp. 158-163 (2014).*
Mahajan et al. "Concentration dependent structural, optical and electrochormoc properties of MoO3 thin films." Int. J. Electrochem. Sci., vol. 3 pp. 953-960 (2008).*
Search Report of corresponding PCT/GB2007/050765.
"The Merck Index: An Encyclopedia of Chemicals, Drugs, and Biologicals," Merck & Co., Inc. p. 6148 and p. 10051 (1989).
Statement of Opposition filed against EP 2465691, Dec. 23, 2014.
Lati Thermoplastics Laser marking, trade publication printed Jan. 8, 2008.
Notice of Opposition for European Patent Application No. 11193977.3.

*Primary Examiner* — Martin Angebranndt
(74) *Attorney, Agent, or Firm* — LeClairRyan, a Professional Corporation

(57) ABSTRACT

There are described compositions and methods for the laser marking of products or their packaging. The compositions comprise transition metal oxides, saccharides and/or flame-retardant agents, optionally with other additives, dispersed in a carrier.

26 Claims, No Drawings

(56) References Cited

FOREIGN PATENT DOCUMENTS

| WO | 00/78554 A2 | 12/2000 |
| WO | 01/23189 A1 | 4/2001 |
| WO | 2005/012442 A1 | 2/2005 |
| WO | 2005/068207 A | 7/2005 |
| WO | 2006/016899 A1 | 2/2006 |
| WO | 2006/042715 * | 4/2006 |
| WO | 2007-012578 * | 2/2007 |
| WO | 2007/031454 A2 | 3/2007 |
| WO | 2007/063332 * | 6/2007 |
| WO | 2007/098919 A1 | 9/2007 |

* cited by examiner

LASER MARKING

This application is a U.S. national stage entry under 35 U.S.C. §371 of International Patent Application No. PCT/GB2007/050765, filed Dec. 18, 2007, which claims priority from Great Britain Patent Application No. 0625186.2, filed Dec. 19, 2006; Great Britain Patent Application No. 0625187.0, filed Dec. 19, 2006; and Great Britain Patent Application No. 0625188.8, filed Dec. 19, 2006.

This invention relates to the laser marking of products or their packaging, and in particular to improved laser-sensitive compositions that may be applied to products or their packaging and which exhibit a colour change when irradiated by a laser.

On-line coding methods used in the pharmaceutical, food and confectionery industries include conventional printing methods such as inkjet and thermal transfer printing, as well as laser-ablative coding. These methods suffer from a number of disadvantages. For instance, they may require extensive maintenance and hence be prone to lengthy downtime, and/or may present problems in that the ink compositions used may taint the products to which they are applied and may necessitate the use of fume extraction systems.

Laser-markable compositions offer an alternative to conventional ink-printing techniques in the marking of confectionery, food or pharmaceutical packaging for identification or safety purposes, including markings such as date or batch codes, bar codes, and serial numbers. Laser marking is a clean and rapid process which produces permanent, rub-fast, scratch-proof, and solvent-resistant markings. The laser marking process does not generate waste, or involve the use and disposal of hazardous solvents.

Despite these advantages, laser marking of products is not without certain problems. In particular, the laser power that is required in order to achieve a high contrast and durable mark may be substantial. Lasers capable of generating such high power radiation may be expensive and/or bulky and difficult to install as part of a manufacturing line. Furthermore, the use of high power lasers may lead to a risk that the substrate that is marked may be punctured, particularly where that substrate has the form of a thin polymeric film. There is therefore a need for laser-markable compositions that are sensitive to laser radiation and that produce a clear and reproducible change in colour, even when the laser radiation is of relatively low power.

According to a first aspect of the invention, there is provided a composition for application to a substrate to render the substrate laser-markable, which composition comprises a transition metal oxide dispersed in a carrier, the composition further comprising one or more sensitising compounds and having an alkaline pH.

The invention further provides a laser-markable coating obtained by drying of a composition comprising a transition metal oxide dispersed in a carrier, the composition further comprising one or more sensitising compounds and having an alkaline pH.

The compositions according to the invention are advantageous primarily in that they permit the use of robust, low power laser sources to produce effective marking of the substrates (products or packaging) to which the laser-markable compositions are applied. The invention provides the advantages common to known forms of laser marking, such as the avoidance of printing compositions containing potentially harmful solvents, the fact that printing occurs in a non-contact manner and can occur at a station within a manufacturing line, and that there is no need for fitting and replacement of printing cartridges, ribbons etc on the packing line, and hence no need for the purchase and stocking of such consumables. In addition, however, the possibility of using low power laser sources leads to high reliability and hence low maintenance costs and reduced down-time, and particularly importantly to the reduction or elimination of any risk of puncturing of packaging materials, and also to the possibility of marking of a substrate through a thin packaging film without puncturing of that film.

A range of different transition metal oxides may be used in the present invention. However, preferred transition metal oxides are molybdenum, tungsten and vanadium oxides. Molybdenum oxides, in particular molybdenum trioxide, are especially preferred for use in the invention.

Without wishing to be bound by any particular theory, it is believed that effective colour changes occur in the laser markable compositions of the invention when the transition metal undergoes ready changes in oxidation state when the composition undergoes localised heating brought about by laser irradiation. It is believed that the alkaline medium of the carrier, which typically incorporates ammonia or amine compounds, sensitizes the metal oxide and leads to the formation of complex coloured mixtures of metal oxides and ammonium salts. In the absence of such sensitisation, it is found that compositions containing the transition metal oxides mark only very poorly, and/or require very high laser power in order for marking to be achieved. In an earlier proposal (see WO-A-00/78554), a transition metal oxide such as molybdenum trioxide has been used, but only as a fixing material that melts under the influence of the laser radiation to bind and stabilise a discoloured pigment.

In general, the composition according to the first aspect of the invention should be sufficiently fluid that it can be applied to a substrate by conventional means. Drying of the composition, which in this context means solidification of the composition to form a coating, may involve cross-linking or polymerisation of the carrier and/or loss of solvent.

The carrier may be water-based or organic solvent-based or solvent-free. The carrier may have the form of a solution or of a suspension or emulsion. The carrier may be polymeric or non-polymeric, or may comprise polymer precursors in the form of monomers or oligomers that polymerise during the drying process.

In certain embodiments of the invention, the carrier is an alkaline polymer emulsion or solution. Typically, suitable such emulsions or solutions include those that are designed for incorporation into printing inks. One example of a suitable polymer emulsion is that supplied under the trade name TEXICRYL 13-567 by Scott Bader Company Limited of Wollaston, Wellingborough, Northants NN29 7RL, United Kingdom (TEXICRYL is a registered trade mark). TEXACRYL 13-567 is a modified styrene acrylic copolymer with the following approximate characteristics:

| | |
|---|---|
| Solids content | 52% |
| Viscosity at 25° C. (Brookfield RVT, Spindle 4, 100 rpm) | 175 cps |
| pH | 8.5 |
| Specific gravity at 25° C. | 1.06 |
| Mean particle size | 275 nm |
| Minimum film formation temperature | 15° C. |
| Glass transition temperature | 30° C. |

The alkaline carrier will have a pH that is greater than 7.0, and preferably the pH will be greater than 7.5, and more preferably greater than 8.0. The pH may be greater than 9.0 or greater than 10.0.

The sensitising compound(s) are most preferably ammonia or one or more ammonium salts or amines. Amines that may be incorporated into the carrier include alkyl, aryl, cycloaliphatic, and heterocylic amines, as well as amino sugars and polymeric salts or compounds of ammonia or amines. One example of a suitable aliphatic amine that may be incorporated into the carrier is ethanolamine (2-aminoethanol). Ammonium salts that may be used include ammonium carbonate and ammonium bicarbonate.

Another class of amino compounds that may act as sensitisers when incorporated into the carrier are amino acids, in particular α-amino acids, and especially α-amino acids that contain one or more additional amine groups, as well as peptides and polypeptide compounds including proteins. Examples of amino acids that may be used include arginine and lysine.

In other embodiments of the invention, the carrier comprises a non-alkaline polymeric binder, together with ammonia or one or more amines as described above. Polymeric binders that may be used include a wide range of soluble synthetic polymers. Examples include acrylate and methacrylate polymers, one example of which is the ethyl methacrylate copolymer sold under the trade name ELVACITE 2043 by Lucite International of Lucite Center, 7275 Goodlett Farms Parkway, Cordova Tenn. 38016, USA (ELVACITE is a registered trade mark). Other suitable polymeric binders include cellulose derivatives such as nitrocellulose and cellulose acetate propionate. Further classes of polymers that may be used as binders include polyvinyl butyral, polyurethane resins, epoxide resins, polyester resins, polyamides, polyimides, epoxy/vinyl/polyester coatings and lacquers, polyvinylalcohol, polyvinyl acetate and siloxane resins.

The polymeric binder will generally be dissolved or dispersed in a solvent. Suitable solvents include those that are commonly used for inks and lacquers, eg water, ethanol, ethyl acetate, isopropyl alcohol, lower hydrocarbons, and others. A particular solvent system that may be used is ethanol/ethyl acetate, typically in a 3:1 blend. Most commonly, the solution will contain up to about 40% w/v of polymer, more commonly up to about 30% w/v, eg about 20% w/v. One less favoured solvent, that is preferably absent from the compositions according to the invention, is propylene glycol ether.

The transition metal oxide will generally be present in the composition according to the first aspect of the invention at a level of up to 80% w/w, but more commonly up to 50% w/w or 25% w/w, more typically up to 20% w/w. Generally, the concentration of transition metal oxide will be greater than 2% w/w, and usually more than 10% w/w. Most preferably, the concentration of transition metal oxide will be more than 2%, 4%, 6%, 8% or 10% w/w, and up to 16%, 18% or 20% w/w. Typically, the concentration of transition metal oxide will fall in one or more of the following ranges: 2%-20%, 2%-18%, 2%-16%, 4%-20%, 4%-18%, 4%-16%, 6%-20%, 6%-18%, 6%-16%, 8%-20%, 8%-18%, 8%-16%, 10%-20%, 10%-18%, and 10%-16% w/w.

The concentration of amine compounds, where present, will generally be up to 10% w/w, and usually at least 2% w/w.

The composition preferably does not contain an oxide other than one or more transition metal oxides. In particular, the composition preferably does not contain bismuth oxide, and particularly not a blend of titanium dioxide and bismuth oxide. Titanium dioxide may, however, be utilised as a whitening agent.

It has also been found that the colour change that occurs in the laser markable compositions of the invention may be further enhanced by the inclusion in the compositions of one or more sugars, polysaccharides or derivatives thereof. In particular, the composition may contain one or more simple sugars such as glucose and fructose, one or more polysaccharides such as starch and cellulose, or one or more sugar or polysaccharide derivatives, eg an amino sugar. Where such materials are present, they usually account for between 2% and 50% w/w of the composition according to the first aspect of the invention, more commonly between 5% and 10% w/w.

It has been found that the inclusion of sugars and the like in laser-markable compositions comprising various transition metal compounds is beneficial.

It is well documented in the patent literature that ammonium molybdate, ammonium dimolybdate, ammonium heptamolybdate, ammonium octamolybdate, ammonium paratungstate, ammonium metatungstate and ammonium metavanadate undergo an irreversible colour change when exposed to laser energy. However, the majority of these materials require relatively high laser energy to undergo the colour change process and even then in some cases the colour change is very poor. Furthermore, the energy required to bring about the colour change is too high for marking of some sensitive packaging materials.

According to a second aspect of the invention, there is thus provided a composition for application to a substrate to render the substrate laser-markable, which composition comprises a transition metal compound in the form of an oxide or a salt of a transition metal oxyanion, the transition metal compound being dispersed in a carrier, wherein the composition further comprises a saccharide or a derivative thereof.

This aspect of the invention further provides a laser-markable coating obtained by drying of a composition comprising a transition metal compound in the form of an oxide or a salt of a transition metal oxyanion, the transition metal compound being dispersed in a carrier, wherein the composition further comprises a saccharide or a derivative thereof.

A range of different transition metal oxides may be used in the second aspect of the present invention. However, preferred transition metal oxides are molybdenum, tungsten and vanadium oxides. Molybdenum oxides, in particular molybdenum trioxide, are especially preferred for use in the invention.

Where the composition comprises a salt of an oxyanion of a transition metal, the cation may be an alkali or alkaline earth metal ion or, more preferably, an ammonium ion.

The oxyanion may be a molybdate, vanadate or tungstate or a similar oxyanion of another transition metal. The salt may thus be a di-, hepta- or octa-molybdate, or a similar polyvalent salt of tungsten or vanadium.

Particularly preferred salts are ammonium heptamolybdate, ammonium metastungstate and ammonium paratungstate.

The transition metal oxide or salt of a transition metal oxyanion may be present in the composition according to the second aspect of the invention at a concentration of from 5% to 80% w/w, more commonly from 10% to 20% w/w.

The term "saccharide" in the context of this invention should be taken to encompass monosaccharides, disaccharides, oligosaccharides and polysaccharides. The saccharide component of the composition according to the second aspect of the invention may be a simple sugar, or a polysaccharide, or a derivative of either thereof. In particular, the composition may contain one or more simple sugars such as glucose, sucrose and fructose, one or more polysaccharides such as starch and cellulose, or one or more sugar or polysaccharide derivatives, eg an amino sugar. The saccharide materials may account for between 2% and 50% w/w of the composition, more commonly between 4% and 10% w/w.

Without wishing to be bound by any particular theory, it is believed that effective colour changes occur in the laser markable compositions of the second aspect of the invention when new compounds or complexes are formed as a result of interaction between the transition metal compounds and the saccharide components of the composition. In addition, the enhancement of the laser markability may be due to charring of the saccharide that may be assisted by the transition metal compounds. Furthermore, reducing sugars (ie sugars that, in basic solution, form some aldehyde or ketone) may promote the restructuring of the transition metal compound to give coloured species. The use of reducing sugars is therefore particularly preferred in relation to the second aspect of the invention, in particular at concentrations of up to 10% w/w, eg between 1%, 2% or 4% w/w and 10% or 8% w/w. Particular reducing sugars that may be mentioned are glucose, fructose and maltose, especially glucose and fructose.

The carrier may be water-based or organic solvent-based or solvent-free. The carrier may have the form of a solution or of a suspension or emulsion. The carrier may be polymeric or non-polymeric, or may comprise polymer precursors in the form of monomers or oligomers that polymerise during the drying process.

In certain embodiments of the invention, the carrier is a polymer emulsion or solution. Typically, suitable such emulsions or solutions include those that are designed for incorporation into printing inks. One example of a suitable polymer emulsion is again that supplied under the trade name TEXICRYL 13-567 by Scott Bader Company Limited.

Another carrier that may be employed is the self-cross-linking acrylic copolymer dispersion sold under the trade name NEOCRYL A-1127 by DSM Neoresins, Sluisweg 12, PO Box 123, 5140 AC Waalwijk, The Netherlands (NEOCRYL is a registered trade mark).

In other embodiments of the invention, the carrier comprises a solution of a polymeric binder in a suitable solvent system, as described above in relation to the first aspect of the invention.

The laser markability of the compositions according to both the first and second aspects of the invention may be further improved by the incorporation of one or more ingredients capable of absorbing infra-red radiation. Examples of such IR absorbers include, but are not limited to, particulates such as carbon black, graphite, calcium silicates, zirconium silicates, zeolite, mica, kaolin, talc and cordierite. Other examples of compounds that may function as IR absorbers include colourants such as organic pigments, inorganic pigments and polymer-compatible organic dyes.

Where a low-energy laser, such as diode laser, is used, typically emitting light at a wavelength in the range of 800-2000 nm, the laser energy directly captured by the composition may be less than is desired. In such a case, the composition may advantageously include a suitable IR absorbing material. Suitable IR absorbers include, but are not limited to, metal complexes such as diimine iron complex, dithiol nickel complex, indigo, anthraquinone, azulenium, polycarbocyanine, squarylium, indolizinium, naphthalocyanine, naphthoquinone and its analogues, phthalocyanine, polymethine, pyryllium, thiapyryllium, telluropyryllium, triaryl ammonium, and triquinocycloalkane.

The concentration of IR absorbers, where present in the compositions according to the first aspect of the invention, will generally be up to 50% w/w, more commonly up to 20% w/w, and usually at least 2% w/w. The concentration of IR absorbers in the composition is most commonly between 5% and 20% w/w.

In a related aspect of the invention, it has been found that compositions containing sugars and the like can be made suitably laser-markable by the inclusion in the composition of one or more flame-retarding agents.

It is well documented in the patent literature that materials that carbonise on application of heat, for example carbohydrates, cellulosics and starches, can be marked with laser energy. However, the laser energy required to bring about this process is rather high and this limits the suitability or these materials for marking heat sensitive products. Furthermore, the mark created with laser from such materials presents many drawbacks. For example, the mark has very poor scuff- and water-resistance.

According to a third aspect of the invention, there is provided a composition for application to a substrate to render the substrate laser-markable, which composition comprises a saccharide or derivative thereof dispersed in a carrier, wherein the composition further comprises a flame-retarding agent.

This aspect of the invention further provides a laser-markable coating obtained by drying of a composition comprising a saccharide or derivative thereof dispersed in a carrier, wherein the composition further comprises a flame-retarding agent.

Without wishing to be bound by any particular theory, it is believed that the flame-retarding agent assists the caramelizing/charring of the saccharide component of the composition by laser energy, and thus fixes the mark that is formed. The mark has excellent environmental stability, ie it does not scuff or wash off with water.

The term "saccharide" in the context of this aspect of the invention is as defined above. The saccharide materials may account for between 2% and 50% w/w of the composition, but more preferably is present at a level of more than 5% w/w, and up to 20%, or up to 18% or up to 16% w/w. The concentration of saccharide may therefore fall in one or more of the following ranges: 2%-20%, 2%-18%, 2%-16%, 5%-20%, 5%-18% and 5%-16% w/w.

Examples of suitable simple sugars that may be used in the invention are fructose, glucose, sucrose, galactose, and maltose. The sugar can be in any isomeric form. Thus, D and L forms, as well as mixtures thereof, can be used. Examples of sugar derivatives include mannitol, sorbitol, xylitol, glucose phosphates, gluconolactone, and glucosamines.

Examples of polysaccharides that may be used include, but are not limited to, cellulose, hydroxypropyl cellulose, hydroxypropyl methylcellulose, hydroxyethyl cellulose, ethyl cellulose, methyl cellulose, nitrocellulose, cellulose acetate, cellulose acetate butyrate, cellulose acetate propionate, cellulose phosphate, carboxymethyl cellulose, methoxypropyl cellulose, and alginates.

Flame-retarding agents that may be used include, but are not limited to, di-melamine orthophosphate, melamine polyphosphate, melamine borate, melamine cyanurate, hydroxyl zinc stannate, and zinc hydroxystannate.

Suitable flame-retarding agents include those available under the trade name BUDIT from Brenntag NV, Nijverheidslaan 38, B-8540 Deerlijk, Belgium (BUDIT is a registered trade mark). Particular BUDIT flame-retarding agents that may be mentioned are those known as BUDIT 3141 and BUDIT 313. Other suitable flame-retarding agents are those supplied under the trade name FLAMETARD by William Blythe Ltd of Church, Accrington, Lancashire, UK (FLAMETARD is a registered trade mark). Particular FLAMETARD flame-retarding agents that may be mentioned are those known as FLAMETARD H and FLAMETARD S.

One less favoured additive, that is preferably absent from the compositions of the invention, is hexamethoxymethyl melamine.

The flame-retarding agent may account for between 2% and 50% w/w of the composition, but more preferably is present at a level of more than 5% w/w, and up to 20%, or up to 15% or up to 10% w/w. The concentration of flame-retarding agent may therefore fall in one or more of the following ranges: 2%-20%, 2%-15%, 2%-10%, 5%-20%, 5%-15% and 5%-10% w/w.

The carrier may be water-based or organic solvent-based or solvent-free. The carrier may have the form of a solution or of a suspension or emulsion. The carrier may be polymeric or non-polymeric, or may comprise polymer precursors in the form of monomers or oligomers that polymerise during the drying process.

In all aspects of the invention, the carrier may be curable. In order for the carrier to be curable, it will generally contain an ingredient that is capable of curing by cross-linking or polymerisation when the composition is applied to a substrate. Typically, such curing occurs when the composition is dried.

In certain embodiments of the invention, the carrier is a polymer emulsion or solution. Typically, suitable such emulsions or solutions include those described above.

Another carrier that may be employed is the self-cross-linking acrylic copolymer dispersion sold under the trade name NEOCRYL A-1127 by DSM Neoresins, Sluisweg 12, PO Box 123, 5140 AC Waalwijk, The Netherlands (NEOCRYL is a registered trade mark).

Another carrier that may be employed is that sold under the trade name JONCRYL J77 by BASF Resins NV, Innovatielaan 1, 8466 SN Nijehaske, PO Box 390, 8440 AJ Heerenveen, The Netherlands (JONCRYL is a registered trade mark).

The laser markability of the compositions according to the third aspect of the invention may be further improved by the incorporation of one or more ingredients capable of absorbing infra-red radiation, as described above.

Another class of additive that has been found to enhance the colour change properties of the laser markable compositions of the invention are the organic titanates and zirconates. Specific examples of such compounds are those represented by the following general formulae:

tetraalkyl titanate: $Ti(OR)_4$

Titanate Chelate:

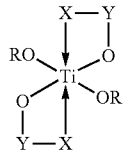

organozirconate: $Zr(OR)_4$ in all of which
the R groups (which may be the same or different) are ligands, most preferably straight or branched chain C2-20 alkyl groups;
X represents a functional group containing oxygen or nitrogen; and
Y represents a two or three carbon chain.

Specific examples of suitable tetraalkyl titanates include, but are not restricted to, tetraisopropyltitanate (available under the trade name TYZOR TPT from DuPont de Nemours and Company, LLC), tetra-n-butyltitanate (available from DuPont under the trade name TYZOR TnBT), tetrakis (2-ethylhexyl)titanate (available as TYZOR TOT from DuPont), diisopropyldiisostearyltitanate or other materials which can be described by the general formula $Ti(OR)_4$.

Specific examples of suitable titanate chelates include, but are not restricted to, acetylacetonate titanate chelate (available from DuPont under the trade name TYZOR TPT), ethyl acetoacetate titanate chelate (available from DuPont as TYZOR DC), diisopropyl di-triethanolamino titanate chelate (available from DuPont as TYZOR TE), lactic acid titanate chelate (ammonium salt) (available from DuPont as TYZOR LA) or other materials which can be described by the general formula above.

Specific examples of suitable organozirconates include, but are not restricted to, zirconium tetra-n-butanolate, zirconium tetra-n-propanolate, and any other material which can be described by the general formula given above.

The concentration of organotitanate or organozirconate, where present in the compositions according to the first aspect of the invention, will generally be up to 10% w/w, and usually at least 2% w/w.

Another class of additive that may enhance the colour change exhibited by the laser markable compositions according to the invention are the so-called leuco dyes, ie dyes whose molecules can exist in two different forms, one of which is colourless and the other coloured. Examples of such dyes include those sold under the trade name PERGASCRIPT by Ciba Specialty Chemicals (PERGASCRIPT is a registered trade mark), in particular PERGASCRIPT Black I-R and PERGASCRIPT Blue I-2RN.

The concentration of leuco dye, where present in the compositions according to the first aspect of the invention, will generally be up to 10% w/w, and usually at least 2% w/w.

The compositions according to the invention may be prepared by simply dispersing the specified ingredients in the carrier. Where additional sensitizing agents are included, these may be added to the carrier, before, after or simultaneously with the principal ingredients. Generally, the ingredients of the composition will be thoroughly mixed, eg by prolonged agitation. A suitable anti-foaming agent may be incorporated into the composition to prevent foaming during agitation.

The compositions may be applied to a substrate (ie to a product or packaging material) by conventional means, eg by spreading or spraying. Spreading of the composition onto a substrate is most preferably carried out using an appropriate mechanical device to ensure application to the desired thickness. Suitable devices include a doctor blade and a Meyer bar, a wire-wound metering rod which is particularly suitable for use in a production environment. Once the composition has been applied, it is generally allowed or caused to dry, either at room temperature or with the application of heat or UV radiation.

The composition may be applied directly to a product, but more commonly is applied to packaging material. Such packaging material may be paper or board, eg cartonboard, or may be a polymeric film, eg of polyethylene or polypropylene.

According to another aspect of the invention, there is provided a substrate at least part of a surface of which carries a laser-markable coating according to the invention.

A further aspect of the invention provides a method of rendering a substrate laser-markable, which method comprises applying to at least part of a surface of the substrate a composition according to the invention.

A yet further aspect of the invention provides a method of laser marking of a substrate, which method comprises exposing a substrate according to the preceding paragraph to laser radiation.

Marking of the composition may be carried out by moving the coated substrate relative to a source of laser radiation. Most conveniently, the laser beam is moved while the substrate is stationary or follows a linear path adjacent to the laser source. The marking that is formed on the substrate may constitute one or more codes used for identification or safety purposes, such as date or batch codes, bar codes and/or serial numbers. It should be understood, however, that the invention is not limited to methods for the application of such codes, but is applicable to the generation of any form of textual and/or graphic marking.

The laser source may be relatively low power laser, operating at power levels of less than 5 W, or less than 4 W, eg 2-3 W. Alternatively, a higher power laser may be used, allowing a more rapid sweep of its beam to be employed, and hence a high rate of marking.

Laser sources that are particularly suitable for use in packaging lines include $CO_2$, Nd-YAG and UV lasers, as well as LED (light emitting diode) lasers, which are relatively inexpensive, robust and reliable.

It should be appreciated that features of the invention that are described in relation to any particular aspect of the invention may be applicable to other aspects, unless incompatible therewith or where it is indicated otherwise.

The invention will now be described in greater detail, by way of illustration only, with reference to the following Examples and Reference Examples.

EXAMPLE 1

Molybdenum Trioxide in an Alkali Binder Emulsion

Molybdenum trioxide (12 g) and defoamer (Hi-mar DFC 80; 0.2 g) were added to a stirred emulsion of Texicryl 13-567 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates were exposed to 10 Watts Videojet Focus 10 $CO_2$ laser using the following parameters:

| Power | 4 W |
|---|---|
| Resolution | 200 dpcm |
| Dwell time | 310 μs |
| Lens | 127 mm |

A good black mark was obtained.

EXAMPLE 2

Molybdenum Trioxide in an Alkali Binder Emulsion and 25% Ammonia Solution

Molybdenum trioxide (12 g), 25% ammonia solution (4 g) and defoamer (Hi-mar DFC 80; 0.2 g) were added to a stirred emulsion of Texicryl 13-567 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates were exposed to 10 Watts Videojet Focus 10 $CO_2$ laser using the following parameters:

| Power | 3-4 W |
|---|---|
| Resolution | 200 dpcm |
| Dwell time | 310 μs |
| Lens | 127 mm |

A good black mark was obtained.

EXAMPLE 3

Molybdenum Trioxide in an Alkali Binder Emulsion and 2-Ethanolamine

Molybdenum trioxide (12 g), 2-ethanolamine (4 g) and defoamer (Hi-mar DFC 80; 0.2 g) were added to a stirred emulsion of Texicryl 13-567 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates were exposed to 10 Watts Videojet Focus 10 $CO_2$ laser using the following parameters:

| Power | 3-4 W |
|---|---|
| Resolution | 200 dpcm |
| Dwell time | 310 μs |
| Lens | 127 mm |

A good black mark was obtained.

EXAMPLE 4

Molybdenum Trioxide in Solvent-Based Acrylic Binder and 2-Ethanolamine

Molybdenum trioxide (12 g), 2-ethanolamine (4 g) and Aerosil 200 (0.6 g) were added to a stirred 20% solution of Elvacite 2043 in ethanol/ethyl acetate (3:1) (60 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| Power | 3-4 W |
|---|---|
| Resolution | 200 dpcm |
| Dwell time | 310 μs |
| Lens | 127 mm |

A good black mark was obtained.

EXAMPLE 5

Molybdenum Trioxide in Solvent-Based Polyvinyl Butyral and 2-Ethanolamine

Molybdenum trioxide (12 g), 2-ethanolamine (4 g) and Aerosil 200 (0.6 g) were added to a stirred 20% solution of polyvinyl butyral in ethanol/ethyl acetate (3:1) (60 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| | |
|---|---|
| Power | 3-4 W |
| Resolution | 200 dpcm |
| Dwell time | 310 μs |
| Lens | 127 mm |

A good black mark was obtained.

EXAMPLE 6

Molybdenum Trioxide in Solvent-Based Nitrocellulose and 2-Ethanolamine

Molybdenum trioxide (12 g), 2-ethanolamine (4 g) and Aerosil 200 (0.6 g) were added to a stirred 20% solution of nitrocellulose in ethanol/ethyl acetate (3:1) (60 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| | |
|---|---|
| Power | 3-4 W |
| Resolution | 200 dpcm |
| Dwell time | 310 μs |
| Lens | 127 mm |

A good black mark was obtained.

EXAMPLE 7

Molybdenum Trioxide in Solvent-Based Acrylic Binder and 2.0 M Ammonia in Ethanol Molybdenum trioxide (12 g), 2.0M ammonia in ethanol (3 g) and Aerosil 200 (0.6 g) were added to a stirred 20% solution of Elvacite 2043 in ethanol/ethyl acetate (3:1) (60 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| | |
|---|---|
| Power | 3-4 W |
| Resolution | 200 dpcm |
| Dwell time | 310 μs |
| Lens | 127 mm |

A good black mark was obtained.

EXAMPLE 8

Molybdenum Trioxide in Solvent-Based Polyvinyl Butyral and 2-Ammonia in ethanol

Molybdenum trioxide (12 g), 2M ammonia in ethanol (3 g), and Aerosil 200 (0.6 g) were added to a stirred 20% solution of polyvinyl butyral in ethanol/ethyl acetate (3:1) (60 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| | |
|---|---|
| Power | 3-4 W |
| Resolution | 200 dpcm |
| Dwell time | 310 μs |
| Lens | 127 mm |

A good black mark was obtained.

EXAMPLE 9

Water-Based Acrylic Binder and L-Arginine

Molybdenum trioxide (6 g), arginine (3 g) and defoamer (Hi-mar DFC 80; 0.15 g) were added to a stirred water-based acrylic binder Texicryl 13-567 (30 g), and the mixture stirred at room temperature with a high speed mixer for approximately 1-2 hours. The resulting off-white dispersion was applied to white carton board using a Meyer bar. The off-white dried coating of the composition on the substrate was exposed to 10 Watts Videojet $CO_2$ laser using the following parameters:

| | |
|---|---|
| Power | 40% |
| Dwell Time | 310 μs |
| Resolution | 196 dpcm |
| Lens | 127 mm |

A good red/brown mark was obtained.

EXAMPLE 10

Water-Based Acrylic Binder and L-Lysine

Molybdenum trioxide (6 g), L-lysine (3 g) and defoamer (Hi-mar DFC 80; 0.15 g) were added to a stirred water-based acrylic binder Texicryl 13-567 (30 g), and the mixture stirred at room temperature with a high speed mixer for approximately 1-2 hours. The resulting off-white dispersion was applied to white carton board using a Meyer bar. The off-white dried coating of the composition was exposed to 10 Watts Videojet $CO_2$ laser using the following parameters:

| | |
|---|---|
| Power | 40% |
| Dwell Time | 310 μs |
| Resolution | 196 dpcm |
| Lens | 127 mm |

A good olive green mark was obtained.

EXAMPLE 11

Molybdenum Trioxide in an Alkali Binder Emulsion, 25% Ammonia Solution and L-Glucose Molybdenum trioxide (12 g), 25% ammonia solution (4 g), glucose (6 g) and defoamer (Hi-mar DFC 80; 0.2 g) were added to a stirred emulsion of Texicryl 13-567 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 2-3 W |
| Resolution | 200 dpcm |
| Dwell time | 310 μs |
| Lens | 127 mm |

A good brown/black mark was obtained.

EXAMPLE 12

Molybdenum Trioxide in an Alkali Binder Emulsion, 25% Ammonia Solution and L-Fructose Molybdenum trioxide (12 g), 25% ammonia solution (4 g), L-fructose (6 g) and defoamer (Hi-mar DFC 80; 0.2 g) were added to a stirred emulsion of Texicryl 13-567 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 2-3 W |
| Resolution | 200 dpcm |
| Dwell time | 310 μs |
| Lens | 127 mm |

A good brown/black mark was obtained.

EXAMPLE 13

Molybdenum Trioxide in an Alkali Binder Emulsion, 25% Ammonia Solution and Iriodin 805 (IR Absorber)

Molybdenum trioxide (12 g), 25% ammonia solution (4 g), Iriodin 805 (6 g) and defoamer (Hi-mar DFC 80; 0.2 g) were added to a stirred emulsion of Texicryl 13-567 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 2-3 W |
| Resolution | 200 dpcm |
| Dwell time | 310 μs |
| Lens | 127 mm |

A good black mark was obtained.

EXAMPLE 14

Molybdenum Trioxide in an Alkali Binder Emulsion, 25% Ammonia Solution and Calcined Clay (IR Absorber)

Molybdenum trioxide (12 g), 25% ammonia solution (4 g), calcined clay (6 g) and defoamer (Hi-mar DFC 80; 0.2 g) were added to a stirred emulsion of Texicryl 13-567 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 2-3 W |
| Resolution | 200 dpcm |
| Dwell time | 310 μs |
| Lens | 127 mm |

A good black mark was obtained.

EXAMPLE 15

Molybdenum Trioxide in an Alkali Binder Emulsion, 25% Ammonia Solution and Tyzor LA Molybdenum trioxide (12 g), 25% ammonia solution (4 g), Tyzor LA (6 g) and defoamer (Hi-mar DFC 80; 0.2 g) were added to a stirred emulsion of Texicryl 13-567 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 2-3 W |
| Resolution | 200 dpcm |
| Dwell time | 310 μs |
| Lens | 127 mm |

A good black mark was obtained.

EXAMPLE 16

Molybdenum Trioxide in an Alkali Binder Emulsion, 25% Ammonia Solution and Pergascript Black I-R (Leuco Dye)

Molybdenum trioxide (12 g), 25% ammonia solution (4 g), Pergascript Black I-R (6 g) and defoamer (Hi-mar DFC 80; 0.2 g) were added to a stirred emulsion of Texicryl 13-567 (60 g), and the mixture was agitated at room temperature for approximately 15-16 hrs. The resulting off-white emulsion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 2-3 W |
| Resolution | 200 dpcm |
| Dwell time | 310 μs |
| Lens | 127 mm |

A good black mark was obtained.

EXAMPLE 17

Molybdenum Trioxide in an Alkali Binder Emulsion, 25% Ammonia Solution and Pergascript Blue I-2RN (Leuco Dye)

Molybdenum trioxide (12 g), 25% ammonia solution (4 g), Pergascript blue I-2RN (6 g) and defoamer (Hi-mar DFC 80; 0.2 g) were added to a stirred emulsion of Texicryl 13-567 (60 g), and the mixture was agitated on a ball mill at room temperature for approximately 15-16 hrs. The resulting off-white emulsion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| Power | 2-3 W |
| --- | --- |
| Resolution | 200 dpcm |
| Dwell time | 310 µs |
| Lens | 127 mm |

A good blue/black mark was obtained.

EXAMPLE 18

Molybdenum Trioxide and Ammonium Carbonate in an Alkali Binder Emulsion

Molybdenum trioxide (12 g), ammonia carbonate (2 g) and defoamer (Hi-mar DFC 80; 0.2 g) were added to a stirred emulsion of Texicryl 13-567 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| Power | 3-4 W |
| --- | --- |
| Resolution | 200 dpcm |
| Dwell time | 310 µs |
| Lens | 127 mm |

A good black mark was obtained.

EXAMPLE 19

Molybdenum Trioxide and Ammonium Bicarbonate in an Alkali Binder Emulsion

Molybdenum trioxide (12 g), ammonia bicarbonate (2 g) and defoamer (Hi-mar DFC 80; 0.2 g) were added to a stirred emulsion of Texicryl 13-567 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| Power | 3-4 W |
| --- | --- |
| Resolution | 200 dpcm |
| Dwell time | 310 µs |
| Lens | 127 mm |

A good black mark was obtained.

EXAMPLE 20

Ammonium Heptamolybdate in Solvent-Based Acrylic Binder and Powdered Cellulose

Ammonium heptamolybdate (6 g), powdered cellulose (2 g) and Aerosil 200 (0.6 g) were added to a stirred 20% solution of Elvacite 2043 in ethanol/ethyl acetate (3:1; 30 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| Power | 2-3 W |
| --- | --- |
| Resolution | 200 dpcm |
| Dwell time | 310 µs |
| Lens | 127 mm |

A good black mark was obtained.

EXAMPLE 21

Ammonium Heptamolybdate in Solvent-Based Acrylic Binder and Glucose

Ammonium heptamolybdate (6 g), glucose (2 g) and Aerosil 200 (0.6 g) were added to a stirred 20% solution of Elvacite 2043 in ethanol/ethyl acetate (3:1; 30 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| Power | 2-3 W |
| --- | --- |
| Resolution | 200 dpcm |
| Dwell time | 310 µs |
| Lens | 127 mm |

A good black mark was obtained.

EXAMPLE 22

Ammonium Metatungstate in Solvent-Based Acrylic Binder and Powdered Cellulose

Ammonium metatungstate (6 g), powdered cellulose (2 g) and Aerosil 200 (0.6 g) were added to a stirred 20% solution of Elvacite 2043 in ethanol/ethyl acetate (3:1; 30 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| Power | 3-4 W |
| --- | --- |
| Resolution | 200 dpcm |
| Dwell time | 310 µs |
| Lens | 127 mm |

A good black mark was obtained.

EXAMPLE 23

Ammonium Paratungstate in Water-Based Binder and Glucose

Ammonium paratungstate (9 g), glucose (2 g) and defoamer (Hi-Mar DFC80; 0.15 g) were added to stirred Neocryl A1127 (30 g), and the mixture agitated on a ball mill for approximately 24 hours. The resulting off-white dispersion was applied to white carton board using a Meyer bar. The dried coating of the composition on the carton board was exposed to 10 Watts Videojet Focus 10 $CO_2$ laser using the following parameters:

| | |
|---|---|
| Power | 4-5 W |
| Resolution | 200 dpcm |
| Dwell time | 310 µs |
| Lens | 127 mm |

A dark olive green mark was obtained.

EXAMPLE 24

Ammonium Metatungstate in Water-Based Binder and Glucose

Ammonium metatungstate (9 g), glucose (2 g) and defoamer (Hi-Mar DFC80; 0.15 g) were added to stirred Texicryl 13-567 (30 g), and the mixture was agitated on a ball mill for approximately 15-16 hours. The resulting off-white dispersion was applied to white carton board using a Meyer bar. The dried coating of the composition on the carton board was exposed to 10 Watts Videojet Focus 10 $CO_2$ laser using the following parameters:

| | |
|---|---|
| Power | 2.5-3.5 W |
| Resolution | 200 dpcm |
| Dwell time | 310 µs |
| Lens | 127 mm |

A dark olive-brown mark was obtained.

EXAMPLE 25

Molybdenum Trioxide in Solvent-Based Acrylic Binder and Cellulose

Molybdenum trioxide (12 g), cellulose powder (6 g) and Aerosil 200 (0.6 g) were added to a stirred 20% solution of Elvacite 2043 in ethanol/ethyl acetate (3:1) (60 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| | |
|---|---|
| Power | 3-4 W |
| Resolution | 200 dpcm |
| Dwell time | 310 µs |
| Lens | 127 mm |

A good black mark was obtained.

EXAMPLE 26

Budit 3141 (Melamine Polyphosphate) and Glucose in Water-Based Binder

Budit 3141 (3 g), glucose (6 g) and defoamer (Hi-mar DFC 80; 0.2 g) were added to a stirred emulsion of Joncryl J77 (30 g), and the mixture was agitated on a ball mill at room temperature for approximately 16-18 hr. The resulting off-white dispersion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 3.5-6 W |
| Resolution | 200 dpcm |
| Dwell time | 310 µs |
| Lens | 127 mm |

A dark brown/black mark was obtained.

EXAMPLE 27

Budit 3141 (Melamine Polyphosphate) and Glucose in Water-Based Binder

Budit 3141 (3 g), glucose (6 g) and defoamer (Hi-mar DFC 80; 0.2 g) were added to a stirred emulsion of Neocryl A1127 (30 g), and the mixture was agitated on a ball mill at room temperature for approximately 16-18 hr. The resulting off-white dispersion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 3.5-6 W |
| Resolution | 200 dpcm |
| Dwell time | 310 µs |
| Lens | 127 mm |

A dark brown/black mark was obtained.

EXAMPLE 28

Budit 3141 (Melamine Polyphosphate) and Powdered Cellulose in Water-Based Binder Budit 3141 (3 g), powdered cellulose (2 g) and defoamer (Hi-mar DFC 80; 0.2 g) were added to a stirred emulsion of Neocryl A1127 (30 g), and the mixture was agitated on a ball mill at room temperature for approximately 24 hr. The resulting white dispersion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 3.5-6 W |
| Resolution | 200 dpcm |

-continued

| | |
|---|---|
| Dwell time | 310 μs |
| Lens | 127 mm |

A brown mark was obtained.

EXAMPLE 29

Budit 313 (Melamine Borate) and Glucose in Water-Based Binder

Budit 313 (3 g), glucose (6 g) and defoamer (Hi-mar DFC 80; 0.2 g) were added to a stirred emulsion of Texicryl 13-567 (30 g), and the mixture was agitated on a ball mill at room temperature for approximately 24 hr. The resulting white dispersion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 4-5 W |
| Resolution | 200 dpcm |
| Dwell time | 310 μs |
| Lens | 127 mm |

A yellow/brown mark was obtained.

EXAMPLE 30

Flametard S (Zinc Stannate) and Glucose in Water-Based Binder

Flametard S (3 g), glucose (6 g) and defoamer (Hi-mar DFC 80; 0.2 g) were added to a stirred emulsion of Texicryl 13-567 (30 g), and the mixture was agitated on a ball mill at room temperature for approximately 24 hr. The resulting white dispersion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 4-5 W |
| Resolution | 200 dpcm |
| Dwell time | 310 μs |
| Lens | 127 mm |

A yellow/brown mark was obtained.

EXAMPLE 31

Flametard H (Zinc Hydroxyl Stannate) and Glucose in Water-Based Binder

Flametard H (3 g), glucose (6 g) and defoamer (Hi-mar DFC 80; 0.2 g) were added to a stirred emulsion of Texicryl 13-567 (30 g), and the mixture was agitated on a ball mill at room temperature for approximately 24 hr. The resulting white dispersion was applied to a range of different substrates (paper, corrugated board, PET and PP films, aluminium foil) using a Meyer bar. The dried coatings of the composition on the substrates mentioned above were exposed to 10 Watts Videojet Focus 10 $CO_2$ laser using the following parameters:

| | |
|---|---|
| Power | 4-5 W |
| Resolution | 200 dpcm |
| Dwell time | 310 μs |
| Lens | 127 mm |

A yellow/brown mark was obtained.

REFERENCE EXAMPLE 1

Molybdenum Trioxide in an Acidic Binder Emulsion

Molybdenum trioxide (12 g) and defoamer (Hi-mar DFC 80; 0.2 g) were added to a stirred emulsion of Texicryl 13-011 (60 g), and the mixture was stirred at room temperature for approximately 1-2 hr. The resulting off-white emulsion was applied to a range of different substrates (paper, corrugated board, PET and PP films, aluminium foil) using a Meyer bar. The dried coatings of the composition on the substrates were exposed to 10 Watts Videojet Focus 10 $CO_2$ laser using the following parameters:

| | |
|---|---|
| Power | 6 W |
| Resolution | 200 dpcm |
| Dwell time | 310 μs |
| Lens | 127 mm |

A poor grey-black mark was obtained.

REFERENCE EXAMPLE 2

Molybdenum Trioxide in Solvent-Based Acrylic Binder

Molybdenum trioxide (12 g) and Aerosil 200 (0.6 g) were added to a stirred 20% solution of Elvacite 2043 in ethanol/ethyl acetate (3:1) (60 g), and the mixture was agitated on a ball mill for approximately 16-20 hours. The resulting blue/grey dispersion was applied to white carton board using a Meyer bar. The dried coating of the composition on the substrate was exposed to 10 Watts Videojet Focus 10 $CO_2$ laser using the following parameters:

| | |
|---|---|
| Power | 6 W |
| Resolution | 200 dpcm |
| Dwell time | 310 μs |
| Lens | 127 mm |

A faint, grey mark was obtained.

REFERENCE EXAMPLE 3

Ammonium Heptamolybdate in Solvent-Based Acrylic Binder

Ammonium heptamolybdate (6 g) and Aerosil 200 (0.6 g) were added to a stirred 20% solution of Elvacite 2043 in ethanol/ethyl acetate (3:1; 30 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| | |
|---|---|
| Power | 4 W |
| Resolution | 200 dpcm |
| Dwell time | 310 µs |
| Lens | 127 mm |

A light grey mark was obtained.

REFERENCE EXAMPLE 4

Ammonium Metatungstate in Solvent-Based Acrylic Binder

Ammonium heptamolybdate (6 g) and Aerosil 200 (0.6 g) were added to a stirred 20% solution of Elvacite 2043 in ethanol/ethyl acetate (3:1; 30 g), and the mixture was agitated on a ball mill for approximately 16-20 hours. The resulting off-white dispersion was applied to white carton board using a Meyer bar. The dried coating of the composition on the substrate was exposed to 10 Watts Videojet Focus 10 $CO_2$ laser using the following parameters:

| | |
|---|---|
| Power | 6 W |
| Resolution | 200 dpcm |
| Dwell time | 310 µs |
| Lens | 127 mm |

A light grey mark was obtained.

REFERENCE EXAMPLE 5

Ammonium Paratungstate in Water-Based Binder

Ammonium paratungstate (9 g) and defoamer (Hi-Mar DFC80; 0.15 g) were added to stirred Neocryl A1127 (30 g), and the mixture was agitated on a ball mill for approximately 24 hours. The resulting white dispersion was applied to white carton board using a Meyer bar. The dried coating of the composition on the carton board was exposed to 10 Watts Videojet Focus 10 $CO_2$ laser using the following parameters:

| | |
|---|---|
| Power | 5-6 W |
| Resolution | 200 dpcm |
| Dwell time | 310 µs |
| Lens | 127 mm |

A grey mark was obtained.

REFERENCE EXAMPLE 6

Ammonium Metatungstate in Water-Based Binder

Ammonium metatungstate (9 g) and defoamer (Hi-Mar DFC80; 0.15 g) were added to stirred Texicryl 13-567 (30 g), and the mixture was agitated on a ball mill for approximately 15-16 hours. The resulting off-white dispersion was applied to white carton board using a Meyer bar. The dried coating of the composition on the carton board was exposed to 10 Watts Videojet Focus 10 $CO_2$ laser using the following parameters:

| | |
|---|---|
| Power | 5-6 W |
| Resolution | 200 dpcm |

-continued

| | |
|---|---|
| Dwell time | 310 µs |
| Lens | 127 mm |

A poor black mark was obtained.

The invention claimed is:

1. A method of laser marking of a substrate, which method comprises exposing the substrate to laser radiation wherein at least part of the substrate carries a coating obtained by drying of a composition comprising molybdenum trioxide, one or more sensitizing compounds selected from the group consisting of ammonia, ammonium salts, amino acids, and amines, said composition having an alkaline pH;
wherein, said composition is prepared by dispersing said molybdenum trioxide in a carrier.

2. A method as claimed in claim 1, wherein the laser source is a $CO_2$, Nd-YAG or UV laser, or an LED (light emitting diode) laser.

3. A composition in the form of a solution, a suspension or an emulsion for application to a substrate to render the substrate laser-markable, wherein said composition comprises:
molybdenum trioxide;
a carrier, which is one or more of a non-polymeric binder, a polymeric precursor binder, or a polymeric binder selected from the group consisting of acrylate and methacrylate polymers and copolymers, cellulose derivatives, polyvinyl butyral, polyurethane resins, epoxide resins, polyester resins, polyamides, polyimides, epoxy/vinyl/polyester coatings and lacquers, and siloxane resins; and
one or more sensitizing compounds selected from the group consisting of ammonia, ammonium salts, amino acids, and amines;
wherein said composition has an alkaline pH and is prepared by dispersing a laser-marking effective amount of molybdenum trioxide in said carrier.

4. A laser-markable coating obtained by drying of a composition according to claim 3.

5. A substrate at least part of a surface of which carries a laser-markable coating according to claim 4.

6. A method of rendering a substrate laser-markable, which method comprises applying to at least part of a surface of the substrate a composition according to claim 3.

7. A composition as claimed in claim 3, wherein the molybdenum trioxide is present at a level of up to 80% w/w, and at a concentration greater than 2% w/w.

8. A composition as claimed in claim 3, wherein the carrier is an alkaline polymer emulsion or solution.

9. A composition as claimed in claim 8, wherein the carrier is a modified styrene acrylic copolymer.

10. A composition as claimed in claim 3, wherein the carrier comprises a non-alkaline polymeric binder, together with ammonia or one or more amines.

11. A composition as claimed in claim 10, wherein the polymeric binder is selected from the group consisting of acrylate and methacrylate polymers.

12. A composition as claimed in claim 10, which composition further comprises one or more sugars, polysaccharides or derivatives thereof.

13. A composition as claimed in claim 12, wherein the concentration of the sugars, polysaccharides or derivatives thereof is between 2% and 50% w/w.

14. A composition as claimed in claim 3, wherein the concentration of amine compounds in the composition is up to 10% w/w, and at least 2% w/w.

15. A composition as claimed in claim 3, which composition further comprises one or more ingredients capable of absorbing infra-red radiation.

16. A composition as claimed in claim 3, further comprising one or more additives selected from the group consisting of amino acids, peptides, polypeptides, organic titanates and zirconates, and leuco dyes.

17. A composition as claimed in claim 3, wherein the carrier is a polymer emulsion.

18. A composition as claimed in claim 3, wherein the carrier is a polymer dispersion.

19. A composition as claimed in claim 3, wherein the carrier is a polymer solution.

20. A composition in the form of a solution, a suspension or an emulsion for application to a substrate to render the substrate laser-markable, wherein said composition comprises molybdenum trioxide and a carrier therefore, said composition further comprising a saccharide or a derivative thereof, wherein said composition is prepared by the steps of
dispersing a laser-marking effective amount of molybdenum trioxide in said carrier; and
adding one or more sensitizing compounds selected from the group consisting of ammonia, ammonium salts, amino acids, and amines to the carrier.

21. A composition as claimed in claim 20, wherein the saccharide comprises a simple sugar.

22. A composition as claimed in claim 21, wherein the simple sugar is selected from the group consisting essentially of glucose and fructose.

23. A composition as claimed in claim 20, wherein the saccharide comprises a polysaccharide.

24. A composition as claimed in claim 23, wherein the polysaccharide is selected from the group consisting essentially of starch and cellulose.

25. A composition as claimed in claim 20, which further comprises one or more ingredients capable of absorbing infra-red radiation.

26. A composition as claimed in claim 20, wherein the polymeric binder is selected from the group consisting of acrylate and methacrylate polymers, cellulose derivatives, nitrocellulose, cellulose acetate propionate, polyvinyl butyral, polyurethane resins, epoxide resins, polyester resins, polyamides, polyimides, epoxy/vinyl/polyester coatings and lacquers, and siloxane resins.

* * * * *